_United States Patent Office_

3,021,287
Patented Feb. 13, 1962

3,021,287
SUGAR REFINING ADSORBENT AND THE PRODUCTION THEREOF
Elliott P. Barrett, Baltimore, Md., assignor, by mesne assignments, to The Baugh Chemical Company, Baltimore, Md., a corporation of Maryland
No Drawing. Filed May 8, 1958, Ser. No. 733,833
6 Claims. (Cl. 252—421)

This invention relates to new adsorbents for the refining of, for example, sugar.

Up to recently bone char, or animal charcoal, was the standard adsorbent in the purification of raw sugar for the removal of color and ash-forming mineral matter, the primary criteria for such a material. Additionally, bone char supplied satisfactorily the other requirements of a sugar refining adsorbent, namely, (1) alkaline buffering power, i.e., the ability to keep the raw sugar solution at a hydrogen ion concentration suppressing the production of substantial amounts of invert sugar, (2) bulk density, and (3) resistance to crushing and abrasion requisite in the refining operation and in periodic regeneration of the char.

More recently satisfactory substitutes for sugar refining have been made from synthetic basic calcium phosphate at least as alkaline as hydroxyapatite (referred to hereinafter as BCP), clay and carbonaceous material, such as starch. BCP products of this type have been developed that possess the attributes required of a sugar refining adsorbent at least equal to those of bone char, or bone black, and they have been and are being used extensively in place of bone char for that purpose. A particular advantage of these synthetic adsorbents is that they retain their activity level over more cycles of use and regeneration than bone char.

One method of preparing such synthetic adsorbents is disclosed and claimed in Patent No. 2,352,932 to James R. West and the present applicant. Briefly, a basic calcium phosphate at least as alkaline as hydroxyapatite [$Ca_3(PO_4)_2 \cdot \frac{1}{3}Ca(OH)_2$] is formed, as described in the patent, in contact with a suspension of clay and a carbonizable organic material under such conditions as to produce a homogeneous mixture of the three. The solids are recovered, as by filtration, washed free from water-soluble matter and formed into shapes, as by extrusion, that are then dried, crushed and screened to appropriate sizes that are then heated to effect carbonizing of the carbonizable material and to harden the shapes through the bonding action of the clay. The heat hardened product may then be crushed to form granules of desired size.

Likewise, according to my patent No. 2,735,823 products made from a plastic mixture of synthetic BCP, clay, carbonizable matter and activated carbon that is extruded under high intensity shearing stresses possess hardness and bulk density comparable to those of bone char while at the same time they are at least equal to bone char in decolorizing power, ash-removing power and alkaline buffering power. Also, these products possess by virtue of their content of active carbon increased decolorizing power and a more favorable distribution of pore volume relative to pore radius than is possessed by natural bone char.

Despite the suitability of such synthetic BCP adsorbents as substitutes for bone char, the cost of the synthetic hydroxyapatite is of prime importance in determining the cost of the product, and depending upon economic conditions it may at times be more advantageous for the sugar industry to use bone char.

In accordance with my copending application Serial No. 486,872, filed February 8, 1955, now Patent No. 2,831,818, granted April 22, 1958, other equally satisfactory substitutes for bone char in sugar refining are provided by treating plastic mixtures of steamed bone meal, clay binder and water, preferably containing also starch or the like, in the manner described above for BCP adsorbents.

It will be observed that in all three of the foregoing adsorbents the BCP or steamed bone meal, as the case may be, is bonded by clay which in addition to acting as a binder confers hardness and abrasion resistance. Although clay thus serves useful and necessary functions in those adsorbents, it has less color removing power than carbon and less ash removing and alkaline buffering power than hydroxyapatite, and its presence in the substantial amount needed for bonding (of the order of 15 or 20 weight percent) represents a component of lesser value than either carbon or hydroxyapatite. Thus the clay binder acts, in effect, as a diluent for the effective color and ash removing component.

It is among the objects of this invention to provide sugar refining adsorbents possessing decolorizing and ash-removing powers, alkaline buffering capacity, density and hardness adapting them to sugar refining; that afford satisfactory substitutes for bone char and the synthetic hydroxyapatite and steamed bone meal adsorbents referred to above; that may be made easily from readily available materials, that avoid the cost of synthetic hydroxyapatite; that make no use of clay and are substantially wholly composed of active adsorbent; and that may be made with standard and readily available equipment.

Other objects will appear from the following specification.

I have now found, that it is upon this surprising discovery that the invention is largely predicated, that in the production of sugar refining adsorbents from sterilized steamed bone, clay is unnecessary and that adsorbents in accordance with the stated objects can be produced from steamed bone and starch alone. The adsorbents of this invention are made by intimately mixing sterilized steamed bone and starch, gauging them to appropriate plasticity with an inert liquid, such as water, forming them into shapes, and drying and heat hardening the shapes. Preferably the plastic mixture is formed into shapes by extrusion, the extruded product is then dried, crushed and screened to appropriate sizes that are then ultimately heat hardened. The heat hardening is conducted in the substantial absence of air at a temperature to carbonize the starch and harden the shapes. The hardened material may then be crushed to form granules of appropriate size.

The steamed bone used in the practice of the invention is also known as de-gelatinized bone. It results from cooking raw animal bone for the commercial production of bone glue. A desirable feature of this material is that it normally contains residual organic material whereby to supply a quantity of carbonizable material that forms carbon, which is desired in the finished product. The steamed bone is used in the customary form of meal, and it may be, by way of example, of such particle size as to be largely of minus 20-plus 200 mesh (Tyler standard), with a substantial proportion, for instance 20 percent, of minus 200 mesh size.

I have found by actual experience that in this way finished granules are produced that are at least equal in their essential sugar refining properties, and in some respects superior, to those of natural bone black and the BCP adsorbents alluded to above. This ability to dispense with clay as a binder, heretofore believed to be essential in these adsorbents, is not understood and is presently unexplainable. Apparently the action is unique to bone meal for starch alone does not achieve the same result with synthetic BCP, i.e., all attempts to extrude BCP-starch mixtures with no clay failed so that fired granules could not be produced. The reason why natural hydroxyapatite and starch bond together in accordance with the present invention when synthetic hydroxyapatite and starch do not is wholly obscure.

Of advantage is the fact that the omission of clay, with its poor color and ash removing power permits the content of carbon and hydroxyapatite to be correspondingly increased.

Although the adsorbents of this invention can be made from steamed bone meal and starch, I have found that activated carbon may be included in the compositions as well as bone black fines of a particle size too small for use in sugar refining.

Although the proportions of steamed bone and starch may be varied, depending upon the particular combination of properties of the product, it is now preferred that the adsorbents of this invention be made from, by weight, about 65 to 90 percent of steamed bone meal and about 10 to 35 percent of starch. Activated carbon may be present in an amount from zero to 35 percent, and bone black fines, say less than 28 mesh Tyler standard, from zero to 30 percent. When carbon and bone black fines are used the steamed bone meal may range from about 40 to 90 percent with the remainder starch.

The ingredients are mixed intimately, gauged with water to form an extrudable plastic mix, say with 44 to 48 pounds of water per 100 pounds of solids, and extruded, most suitably under high intensity shearing stresses. The extruded shapes are dried, crushed and screened to appropriate sizes and then fired in substantial absence of air at a temperature to carbonize the starch and harden the granules. These heat hardened granules may then be crushed for further sizing, if need be.

Table I shows the composition of five adsorbents (S–1, S–2, S–3, S–4, S–8) in accordance with this invention that were made as described above. It shows likewise the properties of those compositions in comparison with those of natural bone black. As appears from the table, products can be made having properties similar to or in excess of those of the natural product. These properties can be varied not only by varying the composition but also by varying the extrusion conditions and the temperature and duration of the heat hardening operation.

Table I

|  | S-1 | S-2 | S-3 | S-4 | S-8 | Natural Bone Black |
|---|---|---|---|---|---|---|
| Formulation (percent): |  |  |  |  |  |  |
| Steamed Bone | 90 | 88 | 65 | 45 | 85 |  |
| Bone Black Fines | 0 | 0 | 25 | 45 | 5 |  |
| Starch | 10 | 10 | 10 | 10 | 10 |  |
| Clay | 0 | 0 | 0 | 0 | 0 |  |
| Activated Carbon | 0 | 2 | 0 | 0 | 0 |  |
| Properties of Finished Product of 10 x 28 mesh particle size range: |  |  |  |  |  |  |
| Hardness (percent) | 96.5 | 95.0 | 96.3 | 93.5 | 94.0 | 93–95 |
| Bulk Density (lbs./ft.$^3$) | 43.9 | 44.8 | 43.1 | 44.0 | 43.0 | 36–41 |
| Surface Area (M.$^2$/g.) |  | 107 | 100 |  |  | 100–120 |
| Pore Volume (cc./g.) |  | 0.26 |  |  |  | 0.25–0.30 |
| Carbon Content (percent) | 7.0 | 8.4 |  |  |  | 7–10 |

Table II is a comparison of the decolorizing power of two of the products of Table I in comparison with that of natural bone black. The comparisons are based upon seven cycles of use and reactivation, new adsorbent being used in each instance at the beginning. These tests were made by contacting 170 ml. of adsorbent with 200 ml. of whole Cuban raw sugar solution (60° Brix) previously clarified by filtration with Celite. These tests were conducted at a temperature of 80° C. for four hours with shaking every half hour. Color is defined as absorbency at 420 millimicrons as measured by a Beckman spectrophotometer, model D.U. Therefore, "percent color removed" is the percentage reduction in absorbency so measured. As the table shows, the average performances of the adsorbents of this invention are equal or superior to that of natural bone black.

Following each four hour contact test the adsorbents were separated from the sugar liquor by filtration and were then washed with hot water (about 200° F.) to reduce retained sugar liquor and impurities to a minimum. The adsorbents were then reburned at approximately 925° F. in a stainless steel retort to exclude air. The reburned materials were then screened to remove any minus 28 mesh particles produced by the handling incidental to testing and reburning, the volumes were measured, and the weight of "make-up," i.e., new adsorbent required to restore the initial volume of 170 ml. was determined. Table II shows the cumulative make-up in grams for the seven cycles of tests. In no case does the make-up for the adsorbents of this invention exceed that for bone black, which shows that the steamed bone meal adsorbents of this invention possess mechanical strength adequate for sugar refining operations.

Table II

| Cycle Number | Percent Color Removed | | |
|---|---|---|---|
|  | Bone Black | S-2 | S-3 |
| 1 | 81.8 | 85.1 | 90.5 |
| 2 | 83.1 | 83.7 |  |
| 3 | 88.4 | 91.3 | 87.5 |
| 4 | 90.5 | 84.9 |  |
| 5 | 89.0 | 88.1 | 89.3 |
| 6 | 91.0 | 91.5 |  |
| 7 | 90.8 | 90.9 |  |
| Total Make-up Required (grams) | 8.8 | 6.1 | 8.6 |

According to the provisions of the patent statutes, I have explained the principle of my invention and have illustrated and described what I now consider to represent its best embodiment. However, I desire to have it understood that, within the scope of the appended claims, the invention may be practiced otherwise than as specifically illustrated and described.

I claim:

1. A method of making a sugar refining adsorbent comprising the steps of forming an intimate plastic mixture consisting essentially of, by weight, about 40 to 90 percent of steamed bone meal, about 10 to 30 percent of starch, zero to 30 percent of bone black fines, zero to 35 percent of activated carbon, and water, forming said mixture into shapes, drying said shapes, and firing the dried shapes in the substantial absence of air to carbonize the starch and harden them.

2. A method of making a sugar refining adsorbent comprising the steps of forming an intimate plastic mixture consisting essentially of, by weight, about 65 to 90 percent of steamed bone meal, about 10 to 20 percent of starch, zero to 25 percent of bone black fines, zero to 25 percent of activated carbon, and water, extruding said mixture to form shapes, and drying and firing the shapes in the substantial absence of air to carbonize the starch and harden them.

3. A method of making a sugar refining adsorbent comprising the steps of forming an intimate mixture of, by weight, about 45 to 90 percent of steamed bone meal, zero to 30 percent of bone black fines, zero to 30 percent of activated carbon, and the remainder substantially all starch, gauging the mixture with water to render it plastic, extruding the plastic mixture to form shapes, and firing the shapes in the substantial absence of air to carbonize the starch and harden them.

4. The method of claim 3 wherein said shapes are dried, crushed and screened before firing.

5. Granular adsorbent material prepared by forming a homogeneous mixture of, by weight, about 40 to 90 percent of steamed bone meal, zero to 30 percent of bone black fines, zero to 35 percent of activated carbon, and the remainder starch, adding water to render the mixture plastic, forming the plastic mixture into shapes, drying said shapes, and firing the dried shapes in the substantial absence of air to carbonize the starch and harden the shapes, the fired granules having properties requisite of a sugar refining adsorbent at least equal to those of bone char of sugar refining grade.

6. Granular adsorbent material prepared according to the method of claim 5 wherein said mixture consists essentially of about 65 to 90 percent of steamed bone meal, zero to 25 percent of bone black fines, zero to 25 percent of activated carbon, and the remainder starch.

References Cited in the file of this patent

UNITED STATES PATENTS

| | | |
|---|---|---|
| 533,106 | Weinrich | Jan. 29, 1895 |
| 1,249,041 | Demme | Dec. 4, 1917 |
| 2,170,601 | Wilson et al. | Aug. 22, 1939 |
| 2,831,818 | Barrett | Apr. 22, 1958 |